(12) United States Patent
Camli et al.

(10) Patent No.: US 8,979,289 B2
(45) Date of Patent: Mar. 17, 2015

(54) ILLUMINATED KNOB FOR HOUSEHOLD APPLIANCE

(75) Inventors: Ugur Camli, Istanbul (TR); Mehmet Baris Gocer, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 52 days.

(21) Appl. No.: 13/977,713

(22) PCT Filed: Dec. 14, 2011

(86) PCT No.: PCT/EP2011/072733
§ 371 (c)(1),
(2), (4) Date: Nov. 6, 2013

(87) PCT Pub. No.: WO2012/089506
PCT Pub. Date: Jul. 5, 2012

(65) Prior Publication Data
US 2014/0056022 A1    Feb. 27, 2014

(30) Foreign Application Priority Data
Dec. 30, 2010   (TR) ............................... A 2010 11184

(51) Int. Cl.
*F21V 8/00*  (2006.01)
*F24C 7/08*  (2006.01)
*G05G 1/10*  (2006.01)
*H01H 19/02* (2006.01)
*H01H 3/08*  (2006.01)

(52) U.S. Cl.
CPC .............. *G02B 6/0096* (2013.01); *F24C 7/082* (2013.01); *G05G 1/10* (2013.01); *G05G 1/105* (2013.01); *H01H 19/025* (2013.01); *H01H 2003/085* (2013.01); *H01H 2219/0622* (2013.01); *H01H 2219/064* (2013.01); *H01H 2231/012* (2013.01)
USPC .................... 362/23.22; 362/23.09; 362/23.1; 362/23.19

(58) Field of Classification Search
USPC ........ 362/23, 26, 27, 29, 30, 253, 234, 23.09, 362/23.1, 23.19, 23.22
See application file for complete search history.

(56) References Cited

U.S. PATENT DOCUMENTS

| | | | |
|---|---|---|---|
| 6,224,221 B1* | 5/2001 | Glienicke | 362/23 |
| 6,876,313 B2* | 4/2005 | Hsiung et al. | 341/35 |
| 7,195,363 B2* | 3/2007 | Horoho et al. | 362/23 |
| 8,783,927 B2* | 7/2014 | Claprood et al. | 362/555 |
| 2002/0075668 A1* | 6/2002 | Dorrie | 362/27 |
| 2004/0070963 A1* | 4/2004 | Miwa | 362/26 |
| 2004/0109304 A1* | 6/2004 | Yokoyama et al. | 362/23 |
| 2007/0195513 A1* | 8/2007 | Nishiyama et al. | 362/23 |
| 2007/0253185 A1* | 11/2007 | Palacio | 362/97 |
| 2012/0012721 A1* | 1/2012 | Baier | 248/224.7 |
| 2013/0163226 A1* | 6/2013 | Chen et al. | 362/85 |

* cited by examiner

*Primary Examiner* — Laura Tso
(74) *Attorney, Agent, or Firm* — Venjuris PC

(57) ABSTRACT

The present invention relates to a household appliance (1) comprising a control panel (2) produced from glass, a circular opening (3) disposed on the control panel (2), a knob (4) disposed in the opening (3), a casing (5) fixed to the rear side of the control panel (2), extending inwards from the control panel (2) and which protects the knob (4), light source (8) LEDs placed on the rear wall of the casing (5) and a light conductor (9) placed in the casing (5) and which provides the periphery of the knob (4) to be illuminated.

15 Claims, 2 Drawing Sheets

ILLUMINATED KNOB FOR HOUSEHOLD APPLIANCE

Figure 1:
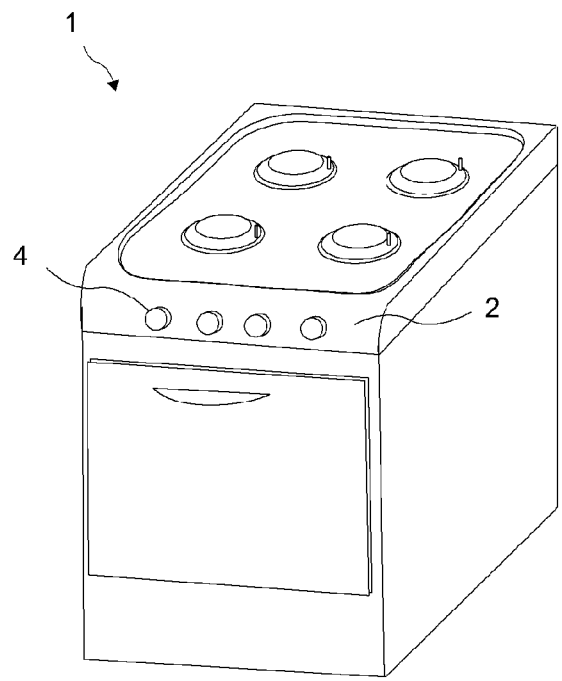

The present invention relates to a household appliance comprising a knob disposed on the control panel and the outer periphery of which is illuminated.

On the control panel of the household appliances, for instance cooking devices, knobs, which provide the household appliance to be operated, are disposed. In terms of ease of use and decorative appearance, the periphery of the knobs is illuminated. In household appliances wherein the control panel is produced from glass, a round hole is opened by performing cut-out operation on the glass panel for placing the knob. Since opening a hole on the glass is a delicate process, small refractions cannot be prevented from occurring at the edge of the opened hole. When the periphery of the knob disposed in the hole is desired to be illuminated, the small refracted points formed at the edges of the hole during production become visible by reflecting light, a homogenous light ring cannot be obtained around the knob and thus the detection of the user is adversely affected. For preventing the formation of refractions at the periphery of the knob hole in glass panels, cutting process is performed with a laser device or the periphery of the knob is coated by serigraphy, but this time unwanted reflections occur at the periphery of the knob due to the bumps formed in the coating by serigraphy. A homogeneous illumination cannot be obtained at the periphery of the knob and the production costs increase.

In the state of the art Japanese Patent Application No. JP2001236860, an illumination device and a knob the light leaks in the periphery of which is prevented are explained.

The aim of the present invention is the realization of a household appliance comprising a knob disposed on the control panel and the outer periphery of which is homogeneously illuminated.

The control panel of the household appliance realized in order to attain the aim of the present invention and explicated in the claims is produced from glass and a retractable rotary knob of push-pull type is placed into a round opening opened on the control panel and the periphery of the knob is illuminated by the LEDs disposed in the knob casing at the inner side of the control panel. The light dispersed from the LEDs is conducted to the opening wherein the knob is placed on the control panel by means of a cylindrical light conductor and an illumination ring and thus the periphery of the knob is illuminated.

A circular flange is disposed at the periphery of the illumination ring which provides the illumination ring to be seated on the control panel and a light barrier surrounding the edge of the circular opening is placed between the flange and the rear surface of the control panel. The light barrier covers the irregularities that form during production at the edge of the circular opening in which the knob is placed, and being behind the control panel, the light barrier cannot be seen by the user.

In an embodiment of the present invention, the light barrier is hoop-shaped and produced from black plastic material and is seated on the flange by being mounted around the illumination ring.

In another embodiment of the present invention, the light barrier is produced by the plastic injection method as a single piece together with the illumination ring.

In another embodiment of the present invention, the rear surface of the control panel is coated or filmed with a paint layer by the serigraphy method for decorative purposes. The paint layer is coated on the control panel such that a certain distance remains between the paint layer and the edge of the opening and the portion, which remains between the paint film layer and the edge of the opening and surrounds the edge of the opening, is closed with the light barrier. Thus, the light barrier also covers the irregularities in the paint layer applied by serigraphy and prevents the unwanted light reflections at the edge of the opening.

In another embodiment of the present invention, the light conductor in the knob casing comprises two cylindrical walls placed one inside the other and provides the periphery of the knob to be illuminated by the light carried by the outer wall. The wall at the inner side does not serve to conduct light and is used only for bearing the knob shaft. For preventing the light from dispersing on the inner wall and fading, paint layers, which absorb light and reduce light reflections between the two telescopic walls, are coated or filmed on the surfaces of the outer wall and the inner wall that face each other. The paint layers are preferably formed by the serigraphy method.

In the household appliance of the present invention, the periphery of the knob is homogeneously illuminated and the light leaks around the knob are prevented by means of a light barrier placed at the edge of the knob hole in the control panel.

Figure 2:
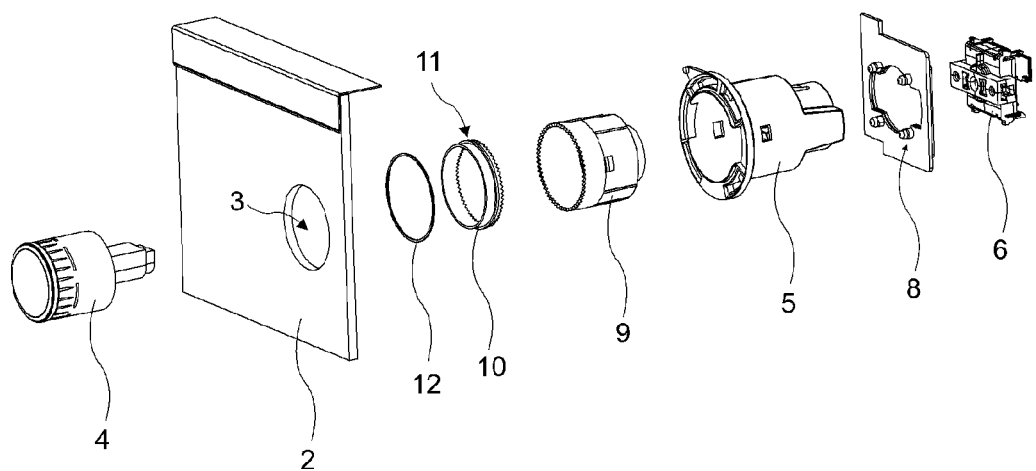
Figure 3:
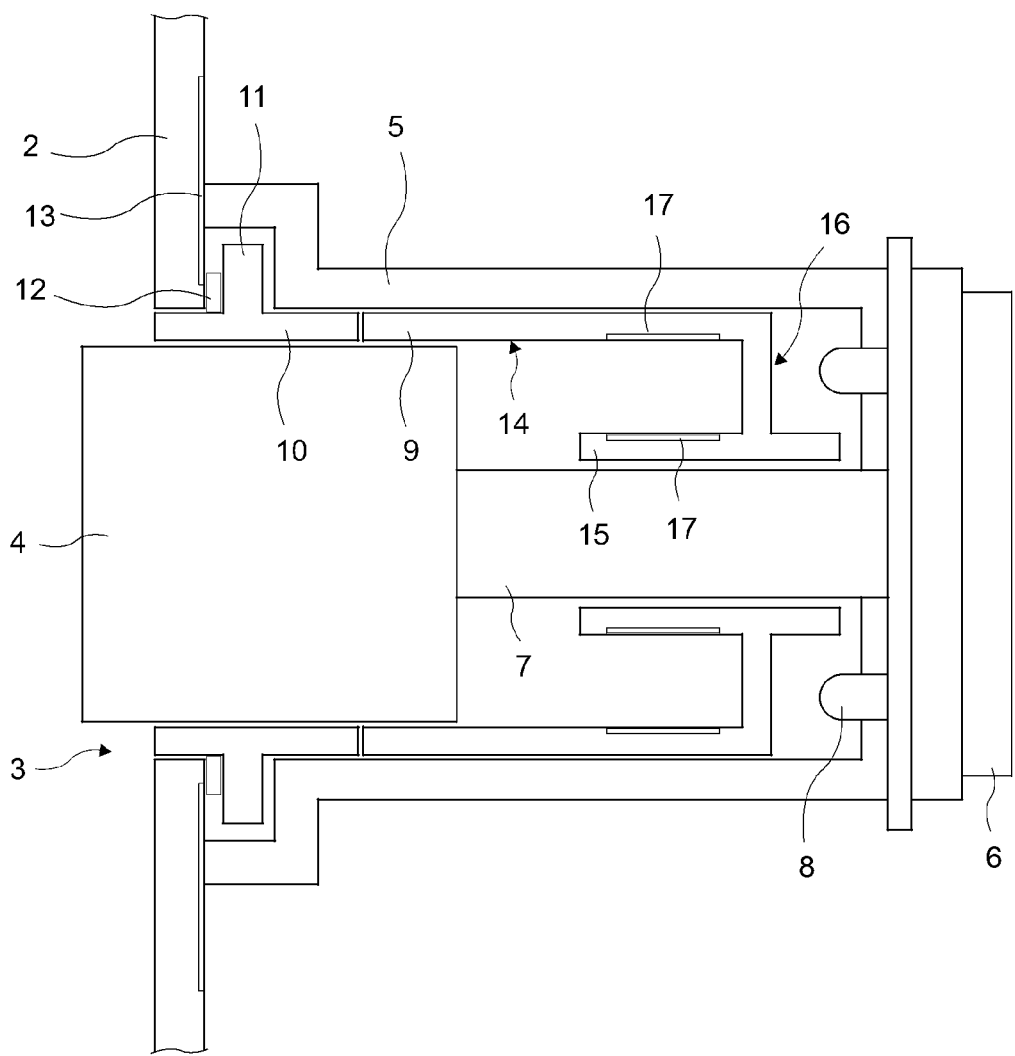

The household appliance realized in order to attain the aim of the present invention is illustrated in the attached figures, where:

FIG. 1—is the perspective view of a household appliance.
FIG. 2—is the exploded view of a control panel and a knob.
FIG. 3—is the schematic view of a control panel and a knob.

The elements illustrated in the figures are numbered as follows:
1. Household appliance
2. Control panel
3. Opening
4. Knob
5. Casing
6. Switching unit
7. Shaft
8. Light source
9. Light conductor
10. Illumination ring
11. Flange
12. Light barrier
13. Paint layer
14. Outer wall
15. Inner wall
16. Base
17. Light absorber The household appliance (1) comprises a control panel (2) produced from glass, a circular opening (3) formed by performing cut-out operation on the control panel (2), a push-pull type and rotary knob (4) placed into the opening (3), a casing (5) fixed to the rear side of the control panel (2), extending inwards from the control panel (2) and which forms a receptacle for the knob (4), a switching unit (6) mounted to the rear side of the casing (5), actuated by the knob (4), a shaft (7) that transmits the movement of the knob (4) to the switching unit (6), more than one light source (8), for example LED, placed on the inner surface of the rear wall of the casing (5), a hollow cylindrical light conductor (9) placed into the casing (5), produced from transparent plastic material, extending from the light sources (8) to the front side of the casing (5), and an illumination ring (10) disposed between the cylindrical outer surface of the knob (4) and the circular edge of the opening (3), which surrounds and bears the knob (4) in the opening (3) and illuminates the periphery of the knob (4) by transmitting the light received from the light conductor (9).

The household appliance (1) of the present invention comprises a circular flange (11) surrounding the illumination ring (10), the diameter of which is greater than the diameter of the opening (3) and which provides the illumination ring (10) to be kept fixed in the axial direction between the knob (4) and the edge of the opening (3) and not to be dislodged from the control panel (2) by bearing against the edge of the opening (3) at the rear side of the control panel (2), and a hoop-shaped light barrier (12) placed between the flange (11) and the rear surface of the control panel (2), entirely contacting the edge of the opening (3), produced from light-proof material and which is invisible to the user from the outside (FIG. 3).

The light emitted from the light sources (8) on the rear wall of the casing (5) is transmitted up to the rear side of the control panel (2) in the casing (5) by means of the light conductor (9) and the light that passes to the illumination ring (10) from the light conductor (9) provides the periphery of the knob (4) to be illuminated so as to be seen by the user by reaching the front side of the control panel (2) through the gap between the edge of the opening (3) and the knob (4).

The light barrier (12) prevents the light conducted in the illumination ring (10) from reaching the edge region of the opening (3) in the control panel (2) contacting the flange (11) around the illumination ring (10) and hence from reflecting from the little refractions that form in this region during production, and provides the periphery of the knob (4) to be homogeneously illuminated as a perfect ring.

In an embodiment of the present invention, the light barrier (12) is produced from black plastic.

In another embodiment of the present invention, the light barrier (12) is produced by the plastic injection method as a single piece together with the illumination ring (10).

In another embodiment of the present invention, the household appliance (1) comprises a paint layer (13) applied by coating or filming on the rear surface of the control panel (2) by the serigraphy method such that a certain distance remains between the paint layer (13) and the edge of the opening (3), and the portion in the vicinity of the edge of the opening (3) which is not coated with the paint layer (13) is covered with the light barrier (12). On the rear surface of the control panel (2), the paint layer (13) and the light barrier (12) partially overlap in the vicinity of the edge of the opening (3). The paint layer (13) is applied on the control panel (2) such that a certain distance remains between the paint layer (13) and the edge of the opening (3) in terms of not causing irregularities and sparkles at the edge of the opening (3), the distance between the edge of the opening (3) and the paint layer (13) is covered with the light barrier (12), and the irregularities of the paint layer (13) in the vicinity of the edge of the opening (3) are concealed by the light barrier (12).

In an embodiment of the present invention, the light conductor (9) comprises a cylindrical outer wall (14) that contacts the inner wall of the casing (5), a cylindrical inner wall (15) that concentrically extends in the outer wall (14) and that provides the shaft (7) to be born and a ring-shaped base (16) with a serrated surface, facing the light sources (8), joining the outer wall (14) and the inner wall (15), and which provides the light to be delivered to the outer wall (14) by entirely dispersing. The outer wall (14) transmits the light, which is transmitted from the base (16) in the radial direction, to the illumination ring (10) by conducting in the axial direction. The inner wall (15) supports the ring-shaped base (16) from the inner edge and bears the shaft (7).

The light conductor (9) furthermore comprises one or more than one light absorber (17) coated on the inner surface of the outer wall (14) and/or the outer surface of the inner wall (15) as a circular strip layer by the serigraphy method (FIG. 3).

The light absorber (17) at least partially prevents the light dispersed from the base (16) from being transmitted to the inner wall (15) in the casing (5) by shadowing the said light. The light absorber (17) provides the light conductor (9) to deliver the light to the illumination ring (10) by conducting the light from the outer wall (14).

In another embodiment of the present invention, the circular edges of the light conductor (9) and the illumination ring (10) that contact each other are in serrated form (FIG. 2). Thus, the light is prevented from condensing at the level of the light sources (8) and the knob (4) is provided to be illuminated all around with the same density.

In another embodiment of the present invention, the light conductor (9) is produced as a single piece together with the illumination ring (10).

In the household appliance (1) of the present invention, the periphery of the knob (4) disposed on the glass control panel (2) is illuminated and a light barrier (12) is placed at the rear side of the edge of the opening (3) wherein the knob (4) is placed so as not to be seen by the user. The light barrier (12) prevents the unwanted reflections in the edge region of the opening (3) by closing the refractions and irregularities that form at the edge of the opening (3) during production and the periphery of the knob (4) is homogeneously illuminated.

It is to be understood that the present invention is not limited by the embodiments disclosed above and a person skilled in the art can easily introduce different embodiments. These should be considered within the scope of the protection disclosed by the claims of the present invention.

The invention claimed is:

1. A household appliance (1) comprising a control panel (2) produced from glass, an opening (3) disposed on the control panel (2), a knob (4) disposed in the opening (3), a casing (5) extending inwards from the control panel (2), a shaft (7) that transmits the movement of the knob (4), one or more than one light source (8) placed on the inner surface of the rear wall of the casing (5), a light conductor (9) placed in the casing (5), extending to the front side of the casing (5) from the light sources (8) and an illumination ring (10) placed between the outer surface of the knob (4) and the edge of the opening (3) and which illuminates the periphery of the knob (4) by transmitting the light received from the light conductor (9), characterized in that a flange (11) surrounding the illumination ring (10) and bearing against the edge of the opening (3) at the rear side of the control panel (2) and a light barrier (12) produced from light-proof material, placed between the flange (11) and the rear surface of the control panel (2) and which entirely contacts the edge of the opening (3).

2. The household appliance (1) as in claim 1, wherein the hoop shaped light barrier (12) produced from black plastic.

3. The household appliance (1) as in claim 2, wherein the light barrier (12) produced as a single piece together with the illumination ring (10) by the plastic injection method.

4. The household appliance (1) as in claim 3, further comprising a paint layer (13) applied on the rear surface of the control panel (2) by the serigraphy method such that a certain distance remains between the paint layer (13) and the edge of the opening (3) and the control panel (2) the portion of which that is not coated with the paint layer (13) in the vicinity of the edge of the opening (3) is covered the light barrier (12).

5. The household appliance (1) as in claim 4, wherein the light conductor (9) comprising a cylindrical outer wall (14) that contacts the inner wall of the casing (5), a cylindrical inner wall (15) that concentrically extends in the outer wall (14) and provides the shaft (7) to be born and a ring-shaped base (16) with a serrated surface, that face the light sources (8) and join the outer wall (14) and the inner wall (15).

6. The household appliance (1) as in claim 5, wherein the light conductor (9) comprising one or more than one light absorber (17) coated on the inner surface of the outer wall (14) and/or the outer surface of the inner wall (15) as a circular strip layer by the serigraphy method.

7. The household appliance (1) as in claim 6, wherein the light conductor (9) and the illumination ring (10) the circular edges of which that contact each other are in serrated form.

8. The household appliance (1) as in claim 6, wherein the light conductor (9) and the illumination ring (10) produced as a single piece.

9. The household appliance (1) as in claim 1, wherein the hoop shaped light barrier (12) produced from black plastic.

10. The household appliance (1) as in claim 1, wherein the light barrier (12) produced as a single piece together with the illumination ring (10) by the plastic injection method.

11. The household appliance (1) as in claim 1, further comprising a paint layer (13) applied on the rear surface of the control panel (2) by the serigraphy method such that a certain distance remains between the paint layer (13) and the edge of the opening (3) and the control panel (2) the portion of which that is not coated with the paint layer (13) in the vicinity of the edge of the opening (3) is covered the light barrier (12).

12. The household appliance (1) as in claim 1, wherein the light conductor (9) comprising a cylindrical outer wall (14) that contacts the inner wall of the casing (5), a cylindrical inner wall (15) that concentrically extends in the outer wall (14) and provides the shaft (7) to be born and a ring-shaped base (16) with a serrated surface, that face the light sources (8) and join the outer wall (14) and the inner wall (15).

13. The household appliance (1) as in claim 12, wherein the light conductor (9) comprising one or more than one light absorber (17) coated on the inner surface of the outer wall (14) and/or the outer surface of the inner wall (15) as a circular strip layer by the serigraphy method.

14. The household appliance (1) as in claim 1, wherein the light conductor (9) and the illumination ring (10) the circular edges of which that contact each other are in serrated form.

15. The household appliance (1) as in claim 1, wherein the light conductor (9) and the illumination ring (10) produced as a single piece.

* * * * *